United States Patent [19]

Ives

[11] Patent Number: 4,504,338
[45] Date of Patent: Mar. 12, 1985

[54] METHODS OF PRODUCING COMPOSITE FOAMED THERMOPLASTIC RESIN ARTICLES

[75] Inventor: Peter J. Ives, Leominster, England

[73] Assignee: H. R. Smith (Technical Development) Limited, Oxfordshire, England

[21] Appl. No.: 367,228

[22] PCT Filed: Aug. 18, 1981

[86] PCT No.: PCT/GB81/00165
§ 371 Date: Mar. 30, 1982
§ 102(e) Date: Mar. 30, 1982

[87] PCT Pub. No.: WO82/00649
PCT Pub. Date: Mar. 4, 1982

[30] Foreign Application Priority Data

Aug. 18, 1980 [GB] United Kingdom ............... 8026857
May 6, 1981 [GB] United Kingdom ............... 8113850
Jun. 1, 1981 [GB] United Kingdom ............... 8116662

[51] Int. Cl.³ .................. B32B 5/20; B32B 31/20; B29D 27/00
[52] U.S. Cl. ....................... 156/79; 156/244.11; 156/324; 264/46.1; 264/46.4; 264/53; 264/257; 264/259; 264/265; 264/DIG. 64; 264/DIG. 5; 425/113; 425/127; 425/817 R; 428/304.4; 428/419; 521/79
[58] Field of Search ............... 264/53, 126, 46.1, 46.4, 264/DIG. 5, DIG. 64, 257, 259, 265; 156/79; 425/113, 127, 817 R; 428/304.4, 419; 521/79

[56] References Cited

U.S. PATENT DOCUMENTS 2,714,076 7/1955 Seckel ........................... 264/126 X
4,179,540 12/1979 Smarook ........................ 264/53 X

FOREIGN PATENT DOCUMENTS 429316 5/1935 United Kingdom .
1062684 3/1967 United Kingdom .
1504559 3/1978 United Kingdom .
1569763 6/1980 United Kingdom .

Primary Examiner—Philip Anderson
Attorney, Agent, or Firm—Murray Schaffer

[57] ABSTRACT

Aromatic polymer materials, such as polyethersulphone, polysulphone or polycarbonates in granular or porous forms with a solvent such as acetone or butanone. The resultant mixture is thereafter compressed and compounded to significantly increase its density producing a pre-form substantially free of large irregular voids. The preform is then capable of being formed in a foamed structure under heat.

21 Claims, 8 Drawing Figures

METHODS OF PRODUCING COMPOSITE FOAMED THERMOPLASTIC RESIN ARTICLES

DESCRIPTION

TECHNICAL FIELD

The invention concerns methods for producing foamed thermoplastics materials and articles.

BACKGROUND ART

The consistent production of foamed thermoplastics materials (for example foamed polyethersulphone—hereinafter referred to as P.E.S.—polysulphone, polycarbonates and the like aromatic polymers) present several problems. One great problem is the production of a suitable preliminary material, precursor or pre-form for the foaming process.

In general a foamed thermoplastics material is formed by heating a pre-form or precursor material leading to a substantial expansion in its volume, and a substantial decrease in its density. To produce consistently high quality foamed thermoplastics material it is necessary that the pre-form material contains no large, visible, random, irregular holes which would lead to irregularities in the size and structure of the cells of the finished, foamed material. Such holes are hereafter referred to as 'voids'.

The known techniques for producing pre-form materials essentially comprise soaking granules of a thermoplastics material to be foamed in a solvent for a considerable period of time (say 170 to 350 hours) and then heating the resultant gel to produce a foam of expanded material with a density substantially less than that of the original thermoplastics material. For example when foaming P.E.S. having an original density of approximately 1370 kgs/m$^3$, steeping granules of P.E.S. in acetone and heating produces an expanded, foamed material with a density of approximately 100 kgs/m$^3$.

The main problem with this method is that air becomes trapped in the gel pre-form material and causes irregularities in the size and structure of the cells in the finished product; the size of holes produced is usually so large that the material is of little use in applications requiring a uniform and readily reproducible product.

It is known that if the gel pre-form is allowed to dry for a considerable period of time (two to three months) after steeping, it is possible to produce a finished article having smaller and more regular cells. However large irregular 'voids' still occur in such materials.

DISCLOSURE OF INVENTION

According to one aspect the invention provides a method of producing foamed thermoplastics materials in which the thermoplastics material is mixed with a solvent and the resultant gel is compressed to form a pre-form material which is then heated.

Fillers, reinforcing fibres of glass, carbon and the like, and/or colourants may also be added.

Chemical blowing or foaming agents may be incorporated in the compression stage. These agents do not generate gas until the pre-forms are heated.

The pre-form material produced may be expanded in a mould containing layers of continuous reinforcement material e.g. glass—or carbon-fibre reinforced materials. A random array of reinforcing fibres may be added to the thermoplastics material during its production to increase its structural stability.

Compression of the thermoplastics/solvent mix may be achieved by making use of a press or a two or three roll compounding mill (for one-off pre-form production), or of an extruder/die combination (for continuous pre-form production).

Other aspects of the invention provide foamed thermoplastics materials formed in accordance with the above methods and articles made thereof.

Experiments we have performed and which exemplify methods embodying the invention will now be described briefly.

The experiments we carried out make use of polyethersulphone (P.E.S.), (a thermoplastics material of the general formula:

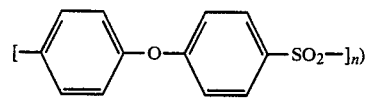

of the three following commercially available grades:
PES 200P (with a reduced viscosity of 0.39–0.43)
PES 300P (with a reduced viscosity of 0.46–0.50)
PES 500P (with a reduced viscosity of 0.34–0.38)
and a normal glass transition temperature (TG) of approximately 222° C. Other grades and copolymers of the above may be used.

Similar results can be expected from polysulphone (of the general formula:

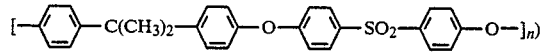

and having a normal glass transition temperature of approximately 174° C., or with polycarbonates.

The various methods of making foamed thermoplastics materials according to the present invention will now be described with reference to the accompanying drawings, in which:

MODES FOR CARRYING OUT THE INVENTION

Figure 1:
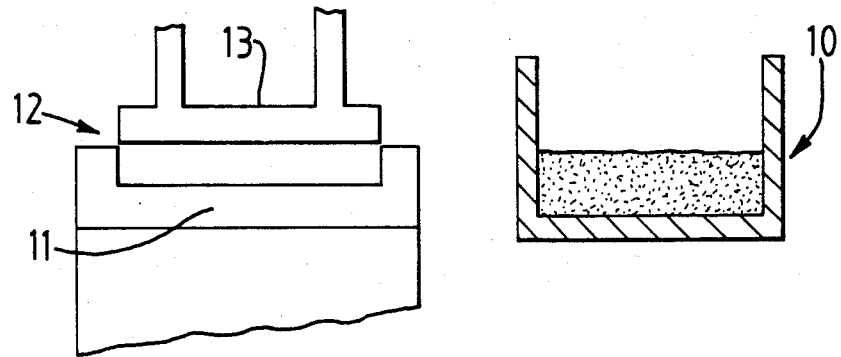
FIG. 1 diagrammatically illustrates one way of making preform material embodying the invention.
Figure 2:
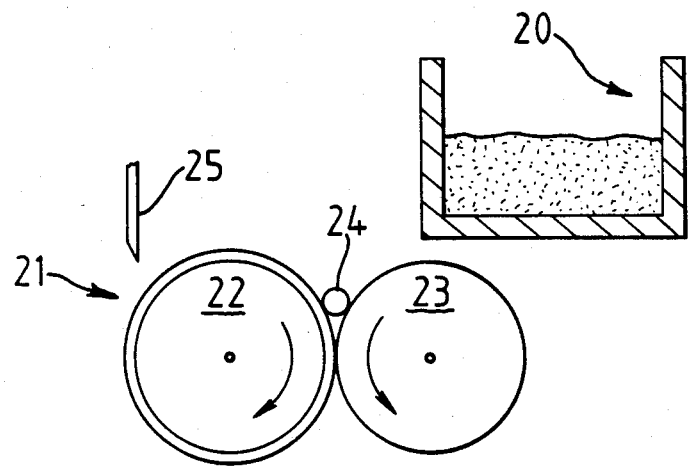
FIG. 2 diagrammatically illustrates another way of making preform material embodying the invention.

FIG. 1 shows a mixing bowl 10 in which powdered P.E.S. 200P is steeped in a solvent, preferably acetone together with a foaming agent (SYLOID 72 for example) and colouring agents and/or fillers as required. As soon as mixing has been completed the content of the bowl 10 is transferred to a member 11 of a compression tool 12 in which it is subjected to pressure by a member 13. When the gel placed in the tool 11 has been compressed to approximately 1.5 mm in thickness member 13 is retracted and the flat sheet removed from press 12. The sheet is folded in four and reinserted in the member 11. After a number of passes the sheet is removed and stored and other sheets prepared in the same way. When a number (say ten), sheets have been prepared in this way they are stacked one on another in member 11 and the stack compressed to a thickness of not more than 5 mm, preferably not more than 3 mm. The compacted stack of sheets is a pre-form material, which may be utilised to form a foamed thermoplastics material article as will be described below. FIG. 2 shows another form of apparatus for preparing a pre-form material embodying the invention. This apparatus comprises a bowl 20 in which powdered P.E.S. is mixed with acetone (and any other suitable filler) in the proportions 500:300 (:5) parts by weight. After thorough mixing in the bowl 20 the resultant gel is passed to a two-roll mill 21 having rolls 22 and 23 as shown which are driven in contra-rotation. There is a build up of compressed material on one of the rolls (say roll 22) and continuous compaction of the material passing through the mill at 24 in the known way. After the mill has been run for 5–10 minutes a knife 25 is used to lift from the roll 22 a sheet of pre-formed material. This sheet of pre-formed material is then placed on one side and a further sheet of pre-formed material prepared in the same way. A number of the sheets prepared in this way are then passed through a further compaction process in a compression moulding tool (as, for example shown in FIG. 1 at 12) or through a further multi-roll mill processing.

It is possible by using multi-roll mill processing to provide continuous production of a pre-form material for example with a multi-roll mill by providing to the input of the mill a continuous supply of the gel material and extracting from the mill the pre-form material.

Figure 3:
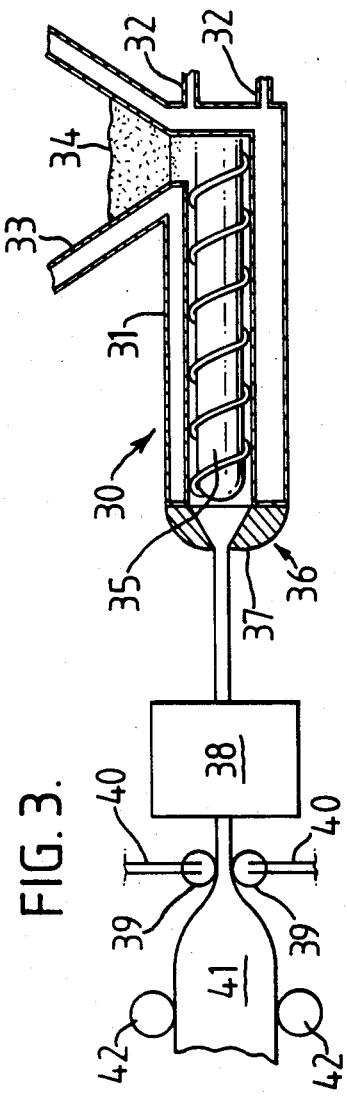
FIG. 3 diagrammatically illustrates apparatus for making foamed thermoplastics materials embodying the invention.

FIG. 3 shows an extruder 30 to be provided with a jacket 31 through which water (which preferably is heated and/or cooled to maintain a temperature of approximately 40° C. in the extruder) is passed via conduits 32. Extruder 30 includes a trough 33 to which a mixture 34 of P.E.S. powder saturated with acetone (or with a mixture of acetone and other agents as discussed above) is fed. Mixture 34 is preferably formed on a continuous basis and passed directly to trough 33.

After passage through trough 33 the mixture falls into a screw 35 and is fed through the extruder to an outlet 36. At the outlet 36 the mixture 34 passes through a die 37 and is then fed to a dryer/extractor 38 (operating at a temperature somewhat less than 70° C.).

The pre-form issuing from the dryer 38 is formed on a continuous basis and may be used in accordance with the methods described below. Alternatively it may be thereafter passed directly between a pair of pinch rollers 39 heated to a temperature of approximately 150° C. (for example electrically or by heated oil passed thereto via conduits 40) so that the pre-form passed to the rollers 40 emerges as a finished foamed thermoplastics sheet material 41 on a continuous basis. When operating in this way it is thought desirable to provide a pair of spaced, chilled sizing rollers 42 as shown to limit the size of the expanded sheet being produced.

It is preferred that the temperature of the heated pinch rollers when using blends containing high levels of plasticiser (with a volatile content in the blend of 10 to 12%) are of the order of 100° to 120° C. With lower levels of volatiles present in the blend, higher temperatures are required for example with P.E.S./acetone blends having a total volatile content of 3 to 6% temperatures in the range of 160° to 180° C. are preferred. It will be readily appreciated that in place of the extruder 30 other suitable compounding device may be used.

Figure 4C:
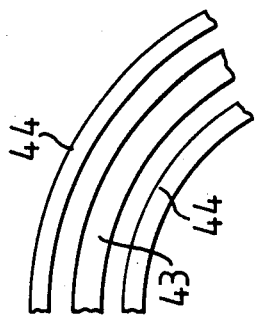
FIG. 4C illustrates the method of forming curved composite material.
Figure 4B:
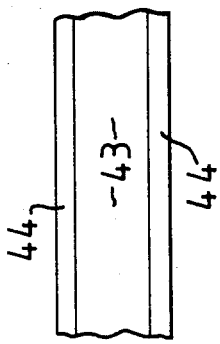
FIGS. 4A and 4B illustrate a method of forming composite foamed/fibre-reinforced thermoplastics materials.
Figure 4A:
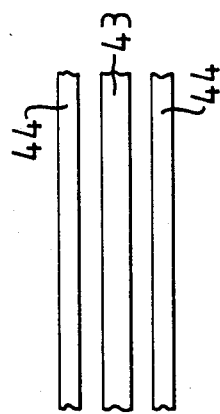

The pre-form material passed to the pinch rollers 39 from the extruder 30 becomes flexible at a relitively low temperature, approximately 40° C., and this feature of it enables the production of composite structure of foamed P.E.S. with glass or other fibre materials such as illustrated in FIG. 4. FIG. 4A shows such an arrangement in which a length of P.E.S. pre-form 43 is sandwiched between two layers 44 of glass or other fibre and the elements clamped or held. Heating of the composite (for example in a microwave oven—or more preferably directly with hot air and/or steam enables the formation of a solid structure) the P.E.S. expanding to completely fill the gap between the other outer layers (FIG. 4B).

The parts 43 and 44 may be heated to approximately 40° C. and bent, as shown in FIG. 4C prior to further heating whilst held in a mould to produce a non-flat composite structure of a desired shape.

The composites in such an arrangement are coated on their facing surfaces with a P.E.S. solution to enable bonding between the various laminae.

This technique may be used to form composite 'sandwich' constructions in which a layer of any material, for example metal, glass—or carbon-fibre matrices or glass- —or carbon-fibre-reinforced thermoplastics material laminates are bonded to the core of foamed thermoplastics material as that core is foamed. This is of particular advantage in forming various articles.

Figure 5:
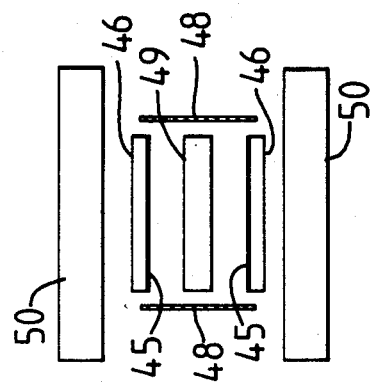
FIG. 5 diagrammatically illustrates one apparatus for effecting manufacture of composite foamed/fibre-reinforced thermoplastics materials.

An example of the technique will now be described with reference to FIG. 5.

It is preferred in such cases for the solvent plasticised layers or film used as the interface between the foamed core material and the outer layers be derived from a partially dried solution of P.E.S. in N Methyl-2-Pyrrolidone (N.M.P.) (or N.M.P. diluted with a liquid hydrocarbon such as Xylene or Toluene—preferably the ratio of N.M.P. to hydrocarbon being 2:1 or greater). Solevent mixtures such as Dichloromethane, or Dichloromethane with N.M.P., 1,1,2, Trichloroethane or combination thereof may also be used.

The solution is spray, roll or brush coated as shown at 48 onto the P.E.S. containing layer 46 then partially heat dried (for example with N.M.P. solutions, at temperatures of between 60° C. and 200° C. for 10 minutes) the drying temperature being dependent on the foaming temperature and solution composition.

Two dried skins 46 are then laid-up in a mould 48 to be used with a P.E.S. pre-form 49 therebetween. The mould 48 is placed between the platens 50 of a heated compression moulding machine (or in an air circulating oven or in a heated autoclave—the moulds in the latter cases being suitably clamped) and the temperature of the heating system utilised is set to operate at the desired foaming temperature (in the range of 100° C. and 210° C.). On foaming the pre-form 49 expands and the surface of the foam contacts the plasticised P.E.S. film 45 which bonds the foam surface to the layer 46. An extended cycle time is used to remove any excess solvent from the skin 46 and foamed material.

Multi-layered structures may similarly be produced such as a film/pre-impregnated foam/pre-impregnated film sandwich construction. Such materials are useful for aircraft and ship panels.

The layer 46 maybe a pre-produced laminated, fibre re-inforced P.E.S. composite, or a metal such as aluminum, stainless steel, mild steel. If layer 46 is a metal it is preferably spray, brush or roll coated with a layer of P.E.S. solution which is dried and then baked onto the surface of the metal. A typical cycle for batch production of P.E.S. prepared metal surfaces being 10 minutes at 90° C. followed by 10 minutes at 380° C. The prepared surface of the metal may then be treated in a similar manner to a normal P.E.S. containing skin.

By using pre-treated metal surfaces such as phosphated mild steel or an aluminum surface with a chromate finish (e.g. I.C.I.'s ALOCROM 1200), the final baking temperature may be reduced from 380° C. to below 300° C.

For skins containing no P.E.S. a curing resin having a suitable curing temperature may be substituted for the P.E.S. solution. For example copper may be bonded to the foamed pre-form with a thermosetting epoxy resin such as Aruldite MY750 in printed circuit board applications, in particularly in "low loss" printed circuit boards for antennae.

Figure 6:
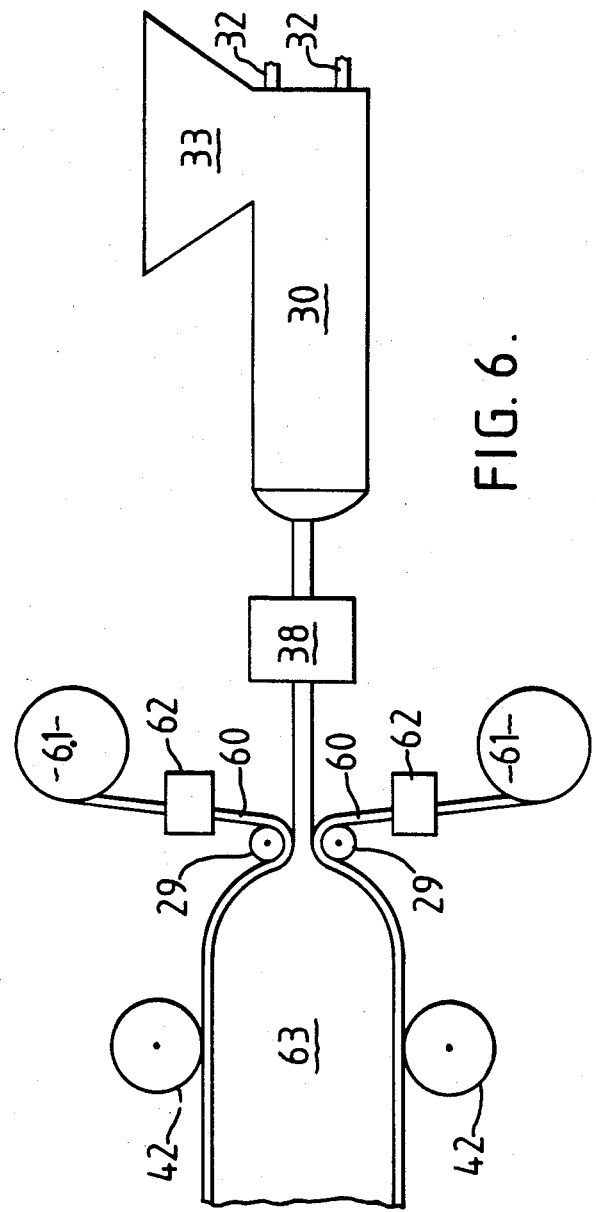
FIG. 6 diagrammatically illustrates another form of apparatus for effecting continuous production of a composite foamed/fibre-reinforced thermoplastics material sheet.

FIG. 6 discloses a modified form of the apparatus of FIG. 3 for use in forming continuous lengths of foamed/fibre re-inforced laminate constructions. Parts of this apparatus common to the arrangement of FIG. 3 are given the same reference numerals and will not further be described.

With the arrangement of FIG. 6 the pre-form issuing from the dryer 38 is passed to the pinch-rollers 39 which also have fed to them lengths of fibre-reinforced laminates 60 from rollers 61 as shown. The surfaces of the lengths 60 which contact the pre-form passed to the rollers 39 are coated with an adhesive layer, preferably a solution of P.E.S. in N.M.P. diluted with Xylene or Toluene, at coating stations 62. On passing through the heated pinch rollers 29 a continuous length 63 of composite material formed with an inner core of foamed thermoplastics material and outer layers of fibre-reinforced thermoplastics laminates is produced. Sizing rollers 42 again control the thickness of the finished product.

If the pre-form produced in accordance with the above methods is not to be used immediately it is preferred that it is cooled rapidly to a temperature below the boiling point of the volatile plasticiser included in it. For example with P.E.S./acetone pre-forms, the pre-forms, if not to be used immediately, should be cooled to below 70° C. It is essential that pressure be maintained on the pre-form during this rapid cooling period.

It is preferred that if the pre-form is to be foamed into a shell or cavity the dimensions of the shell or cavity should be such that the pre-form expands to sixteen times its original volume during foaming.

It will be appreciated that modifications may be made to what has been described above without departing from the scope of the present invention. In particular the arrangement of FIG. 1 lends itself to the incorporation in the P.E.S./solvent mix of chopped glass—or carbon-fibres (3 mm or longer) leading to an increase in the strength of the foamed product finally produced.

With the arrangement of FIG. 3 it is possible to replace the extruder shown with a vented extruder and use a higher boil point plasticiser (such as a longchain alphatic oxide or epoxy) such that acetone is removed at the vent and plasticisation of the P.E.S. achieved by the second plasticiser. In this way it is possible to produce plasticised P.E.S. which has, to our knowledge, not yet been achieved by a melt processing technique.

Although described with reference to a mix of P.E.S. and acetone other types of aromatic polymer materials may be used for example polysulphone and polycarbonates.

INDUSTRIAL APPLICABILITY

The adoption of the above methods enable the production of a precursor or pre-form material which may be subsequently processed, following the introduction of the solvent to the thermoplastics material, in significantly less time than has been possible until now. Other advantages are that the working temperature for forming the finished material is substantially lower than might be expected and that a consistent and reproducible foamed material is obtained, that is to say, a foamed material is obtained having a consistent, uniform cell structure.

With the arrangement of FIG. 3 for example the overall production time from start of process to issuance of finished product can be as little as 15 minutes.

Apart from the above noted advantage of being produced substantially more quickly than might otherwise be the case it is noted that the finished foam products produced by the methods embodying this invention are generally safer than the foamed products formed by conventional techniques in that they appear to have a much higher burning point and are significantly less liable, when alight, to give off toxic gases.

Another advantage that the described processes have is that the temperature used in them is significantly lower than would have been anticipated. The melt temperature of P.E.S. is approximately 300° C. and it will be noted that in the processes described the highest temperature used is 180° C.

EXAMPLE I

Granules of P.E.S. 200P were soaked for two weeks in acetone of industrial quality and the resultant gel compressed in a compression moulding press at room temperature. The pressure applied to the gel was such that it was flattened to approximately 1.5 mm in thickness. The flattened material was removed from the press, folding in four, and then returned to the press and pressed again to the same thickness. Folding and re-pressing to the same thickness was continued until a flat sheet was obtained which to external inspection was free of 'voids'.

A number of these sheets were stacked on one another and pressed in a semi-positive compression mould tool at room temperature so that a sheet of even thickness (approximately 5 mm) was obtained. The sheet was allowed to dry at room temperature for 48 hours.

After drying the sheet was heated in a microwave oven so that it foamed, and the resultant material inspected. The foamed material produced by this method showed a significant improvement over those produced by the known processes but still included 'voids'. Before foaming took place in the microwave oven it was noted that some 'voids' had re-appeared in the pre-form material due, it is thought, to its internal contraction during drying.

EXAMPLE II

The gel material produced by the method of Example I was divided into small charges—(about 12 mm³ to 25 mm³)—and loaded into a conventional two-roll compounding mill, the rolls of which had been set in motion. The temperature of the rolls at the beginning of the run was approximately 20° C. The material was compounded into a continuous crepe, a bank of excess material (the thickness of which could be varied in accordance with the spacing of the rollers) were removed as a crepe of reasonably constant thickness. It was found that a thickness of crepe less than 3 mm was best if the contraction voids thought to be produced on drying were to be minimised.

EXAMPLE III

P.E.S. 200P powder was soaked in acetone for 1.5 hours. The resultant gel was opaque white in colour and was passed to the two-roll mill. As the temperature of the mill rose the crape material first became translucent white and then cleared appearing to be of a similar consistency to that produced in Example I.

EXAMPLE IV

A mixture of 99% w/w P.E.S. 200P powder and 1% SYLOID 72 (a finely divided silica, foam nucleating agent sold by W. R. Grace) was steeped acetone for 1.5 hours and then passed to the two-roll mill as with Example II.

EXAMPLE V

P.E.S. 200P powder was treated with acetone until saturated and the resultant gel split into two. Each half was processed in the two-roll mill. In both cases the opacity of the material cleared as the temperature of the mill rose. The second charge appeared to be of better quality than the first and this is thought to be because the mill rolls had been warmed up whilst processing the first charge.

The crepe materials produced by the methods of Examples II to V were heated in a microwave oven and were shown to have excellent foaming characteristics with a low proportion of 'voids'.

It is thought that the remaining voids were again caused by differential contraction of the skin of the crepe and its core during drying. It was discovered that this falling was overcome by allowing the crepes formed in accordance with the methods of Examples II to V to dry out for not less than 48 hours (such that the acetone level in them reduced to between 10-13% w/w) and then loading a number of dried crepes into a pre-heated compression moulding tool at 120° C.-180° C. (the temperature selected being proportional to the percentage of acetone in the crepes compressing the crepes at a pressure of 6.4 MPa and then holding the pressure while cooling the below the boiling point of acetone (70° C.). This produces a pre-form having no visible irregularities, such as voids, and consequently foams from such pre-forms are also free of voids.

It was found that allowing the pre-forms to dry for 30 days reduced the acetone level in them to 6% w/w and final densities of 55 kg/m³, 115 kg/m³ and 200 kg/m³ were obtained from the foamed materials with foaming temperatures of 200° C., 160° C. and 130° C. respectively. The foam produced obtained had closed cells and the cells were of a regular dodecahedral shape.

We have found that certain other keytone solvents e.g. butanone may be used either alone or mixed with one another.

In addition to the use of the foaming agent described above, our experiments with other foaming agents in particular that product sold by Messrs. Fisons Ltd. under the Trade Name Genitron AF100 worked well with PES.

I claim:

1. A method of producing thermoplastic articles consisting essentially of the steps of mixing an aromatic thermoplastic polymer material in granular or powder form with sufficient amount of a solvent comprising a non-aqueous volatile organic solvent or partial solvent of said polymer to form a gel, subjecting the gel so formed to compression to produce a pre-form of substantially greater density than said gel and free of large irregular holes and thereafter heating the pre-form so produced at a temperature at which it foams to form the foamed thermoplastic article.

2. The method according to claim 1 in which a foaming or nucleating agent is added to the polymer material and solvent as they are mixed.

3. The method according to claim 1 of producing foamed polyethersulphone materials in which powdered polyethersulfphone material is mixed with acetone or butanone.

4. A method according to claim 1 in which the polymer material/solvent mix is repeatedly compressed in a compression moulding tool, the compressed material being folded between repeated operations of the moulding tool.

5. A method according to claim 1 in which the polymer material/solvent mix is compressed by passage through a two-roll mill.

6. A method according to claim 1 in which the polymer material/solvent mix is repeatedly compressed in a compression moulding tool, the compressed material being folded between repeated operations of the moulding tool, and in which layers of the mixed, compressed material are stacked in a compression moulding tool and the tool is operated to produce a pre-form.

7. The method according to claim 1 in which the polymer material/solvent mix is compressed by passage through a two-roll mill and in which layers of the mixed, compressed material are stacked in a compression moulding tool and the tool is operated to produce a pre-form.

8. The method according to claims 1 to 3, in which the polymer material/solvent mix is compressed by passage through an extruder and die which is cooled to a temperature below the foaming temperature of the polymer material/solvent mix.

9. The method according to any one claims 1 to 3, in which the polymer material/solvent mix is compressed by passage through an extruder and die which is cooled to a temperature below the foaming temperature of the polymer material/solvent mix, and in which the pre-form so formed is initially dried at a temperature below that at which the polymer material/solvent mix foams and is then passed between a pair of pinch rollers heated to a temperature at which the polymer material/solvent mix will foam, so as to form a continuous length of foamed thermoplastic material.

10. A method according to claim 1 in which a pre-form formed by compression of the thermoplastic material/solvent mix is placed in mould and heated so as to form a foamed thermoplastic article.

11. The method according to claim 1, in which a pre-form formed by compression of the thermoplastic material/solvent mix is foamed in intimate contact with an adhesive coated surface of a layer of material, which layer of material is after foaming bonded to the foamed polymer material so as to form a composite structure.

12. The method according to claim 11, in which the layer is a fibre-reinforced thermoplastic composite material.

13. The method according to claim 12, in which the layer, the adhesive and the pre-form are polyethersulphone, polysulphone or polycarbonate.

14. The method according to claim 13, in which the pre-form material and the layer are of polyethersulphone, and in which the adhesive is a blend of polyethersulphone and N Methyl-2-Pyrrolidone.

15. A method according to claim 14, in which the adhesive is a blend of polyethersulphone and N Methyl-2-Pyrrolidone diluted with Xylene or Toluene.

16. A method according to claim 1 in which the polymer material/solvent mix is repeatedly compressed in a compression moulding tool, the compressed material being folded between repeated operations of the moulding tool, in which layers of the mixed, compressed material are stacked in a compression moulding tool and the tool is operated to produce a pre-form, and in which the pre-form is foamed in intimate contact with an adhesive coated surface of a layer of fibre reinforced thermoplastics material to form a composite structure.

17. A method according to claim 1 in which the polymer material/solvent mix is compressed by passage through an extruder and die which is cooled to a temperature below the foaming temperature of the polymer material/solvent mix, in which layers of the mixed, compressed material are stacked in a compression moulding tool and the tool is operated to produce a pre-form, and in which the pre-form is foamed in intimate contact with an adhesive coated surface of a layer of fibre reinforced thermoplastics material to form a composite structure.

18. A method according to claim 1 in which the polymer material/solvent mix is compressed by passage through an extruder and die which is cooled to a temperature below the foaming temperature of the polymer material/solvent mix, in which the pre-form so formed is initially dried at a temperature below that at which the polymer material/solvent mix foams and is then passed between a pair of pinch rollers heated to a temperature at which the polymer material/solvent mix will foam, to which pinch rollers are also passed one or more layers of fibre reinforced thermoplastic material, the surfaces of which layers which contact the pre-form being coated with a layer of adhesive such that a continuous length of composite foamed thermoplastic-reinforced thermoplastic material is produced.

19. A method of producing a thermoplastic article according to claim 1 wherein the thermoplastic material is an aromatic polymeric material selected from the group consisting of polyethersulphone, polysulphone and polycarbonates, and the organic solvent is selected from the group consisting of acetone and butanone.

20. The method according to claim 19, including the step of adding a foaming agent to said gel prior to compression.

21. The method according to claim 20 including the step of drying said pre-form for a period not less than 48 hours before heating.

* * * * *